(12) United States Patent
Nyström et al.

(10) Patent No.: US 11,544,878 B2
(45) Date of Patent: Jan. 3, 2023

(54) METHOD OF ENCODING AN IMAGE INCLUDING A PRIVACY MASK

(71) Applicant: Axis AB, Lund (SE)

(72) Inventors: Johan Nyström, Lund (SE); Johan Förberg, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 9 days.

(21) Appl. No.: 17/462,481

(22) Filed: Aug. 31, 2021

(65) Prior Publication Data

US 2022/0122294 A1 Apr. 21, 2022

(30) Foreign Application Priority Data

Oct. 16, 2020 (EP) .................................. 20202309

(51) Int. Cl.
*G06V 10/00* (2022.01)
*G06T 9/00* (2006.01)
*H04N 19/105* (2014.01)
*H04N 19/132* (2014.01)
*H04N 19/137* (2014.01)
*H04N 19/159* (2014.01)
(Continued)

(52) U.S. Cl.
CPC ............. *G06T 9/00* (2013.01); *H04N 19/105* (2014.11); *H04N 19/132* (2014.11); *H04N 19/137* (2014.11); *H04N 19/159* (2014.11); *H04N 19/176* (2014.11); *H04N 19/182* (2014.11)

(58) Field of Classification Search
CPC ........... G06T 9/00; G06T 9/001; G06T 9/002; G06T 9/004; H04N 19/40; H04N 19/44; H04N 19/45; H04N 19/114; H04N 19/159; H04N 19/573; H04N 19/577; H04N 19/105; H04N 19/132; H04N 19/137; H04N 19/176; H04N 19/182; H04N 11/146; H04N 11/165; H04N 11/186; H03M 7/6005
See application file for complete search history.

(56) References Cited

U.S. PATENT DOCUMENTS 5,341,489 A * 8/1994 Heiberger ........... G06F 12/0607
365/185.11
7,540,429 B2 * 6/2009 Lapstun ........... G06K 19/06037
235/487
(Continued)

FOREIGN PATENT DOCUMENTS

CN 108702485 A 10/2018
EP 0907940 A1 4/1999
(Continued)

OTHER PUBLICATIONS

Extended European Search Report dated Mar. 2, 2021 for European Patent Application No. 20202309.9.
(Continued)

*Primary Examiner* — Amir Alavi
(74) *Attorney, Agent, or Firm* — Volpe Koenig (57) ABSTRACT

Image encoding within a pixelated privacy mask area is adapted in order to reduce flickering during movement of a camera. Motion vectors are set equal to the movement of the camera, and residuals are set to zero, thereby encoding pixel blocks within the privacy mask area as copies of corresponding pixel blocks in a reference image.

11 Claims, 5 Drawing Sheets

(51) Int. Cl.
*H04N 19/176* (2014.01)
*H04N 19/182* (2014.01)

(56) References Cited

U.S. PATENT DOCUMENTS

| | | | |
|---|---|---|---|
| 8,009,200 B2* | 8/2011 | Goh | H04N 13/20 |
| | | | 348/333.05 |
| 9,282,333 B2 | 3/2016 | Dutt et al. | |
| 9,794,517 B2 | 10/2017 | Ha et al. | |
| 10,051,276 B2* | 8/2018 | Ino | H04N 5/378 |
| 10,104,331 B2* | 10/2018 | Amling | A61B 1/00042 |
| 10,122,928 B2* | 11/2018 | Nattress | G09G 3/2007 |
| 10,341,686 B2* | 7/2019 | Ducloux | H04N 19/156 |
| 10,972,659 B2* | 4/2021 | Ardö | H04N 5/2258 |
| 11,394,892 B2* | 7/2022 | Lee | H04N 5/35554 |
| 11,477,459 B2* | 10/2022 | Pihl | H04N 5/77 |
| 2006/0139484 A1 | 6/2006 | Seo et al. | |
| 2012/0236935 A1 | 9/2012 | Dutt et al. | |
| 2014/0152815 A1 | 6/2014 | Huang et al. | |
| 2018/0324436 A1 | 11/2018 | Danielsson Fan | |
| 2019/0020879 A1 | 1/2019 | Lee et al. | |
| 2020/0177820 A1 | 6/2020 | Kobayashi et al. | |
| 2020/0186822 A1 | 6/2020 | Ardo | |
| 2022/0007040 A1* | 1/2022 | Ward | H04N 5/3532 |
| 2022/0122294 A1* | 4/2022 | Nyström | H04N 19/527 |

FOREIGN PATENT DOCUMENTS

| | | |
|---|---|---|
| EP | 1081955 A2 | 3/2001 |
| EP | 3131295 A1 | 2/2017 |
| EP | 3340624 A1 | 6/2018 |
| KR | 10-2018-0017329 A | 2/2018 |

OTHER PUBLICATIONS

Su et al., "Partial frame content scrambling in H.264/AVC by information hiding," Multimedia Tools and Applications vol. 76, pp. 7473-7496 (2017).

* cited by examiner

METHOD OF ENCODING AN IMAGE INCLUDING A PRIVACY MASK

FIELD OF INVENTION

The present invention relates to encoding of digital images including privacy masks.

TECHNICAL BACKGROUND

Monitoring cameras are used in many different applications, both indoors and outdoors, for monitoring a variety of environments. Images depicting a captured scene may be monitored by, e.g., an operator or a guard. In many camera monitoring applications, it is advantageous to use a camera having a field of view which can be changed or moved in order to be able to cover a larger area. Such a camera is commonly denoted a PT or PTZ camera, where a PT camera is capable of panning and tilting and a PTZ camera is additionally capable of zooming.

In certain situations, there may be a need to treat one part of a captured image differently from another part, such as when there is a need to block or mask part of an image in the interest of personal integrity. This may, for instance, occur when a camera is placed inside a building or inside a bus or a train and the environment outside is to be excluded from the monitoring done by the camera. Another example is when a building with windows is monitored and there is a need to avoid monitoring the inside of the building through the window.

A privacy mask may be static or dynamic. A static privacy mask is usually created by an operator marking the area to be masked on the image in a graphical user interface. The static privacy mask then stays in place until the operator decides to move or remove it. A dynamic privacy mask may change over time. Similar to a static privacy mask, the operator may mark an area in the image where masking is desired, or the dynamic masking may be applied to the entire camera field of view. The operator also enters settings determining when the privacy mask should be applied. For instance, the operator could add settings such that if a face is detected, that face will be masked out.

For PTZ cameras, hiding the view of certain areas for camera monitoring may be especially important given their ability to zoom in on details over long distances and their wide area coverage. In a camera with a movable field of view, static privacy masks are fixed to the camera's coordinate system, ensuring that the masking is maintained in the same area of the scene, even as the camera's field of view changes through panning, tilting and zooming.

Privacy masks may be applied to the image as an overlay. Some privacy masks take the form of a black or otherwise coloured, opaque area. Other privacy masks take the form of blurring, where image data is "smeared" out over the privacy mask area. Yet another variant of masking is mosaic or pixelation masks, where the image inside the privacy mask is divided into pixelation blocks and all pixels of a pixelation block are given the same value (often an average value of several or all the pixels within the pixelation block), such that the image appears blocky inside the privacy mask area. An appropriately configured pixelated mask has the attractive property of allowing some insight of what goes on in the masked area, e.g., by allowing the operator to see that there is a person moving in the masked area, while still disabling identification of the person by hiding identifying characteristics of the person, such as their face, gait, etc.

A problem occurring when applying pixelated privacy masks, especially prevalent when such masks are used in cameras with movable fields of view, is that the mask may oscillate or flicker, which creates an unpleasant user experience. Temporal smoothing has been suggested to mitigate this issue, as described in, e.g., O. Sarwar, A. Cavallaro and B. Rinner, "Temporally Smooth Privacy-Protected Airborne Videos," 2018 *IEEE/RSJ International Conference on Intelligent Robots and Systems (IROS)*, Madrid, 2018, pp. 6728-6733. However, further improvements in this context are of interest.

SUMMARY

Providing a method of encoding images utilizes a privacy mask which reduces annoying visual artefacts in the form of flickering in pixelated privacy masks during camera movement.

According to a first aspect, a method encodes a stream of images captured by an image sensor and comprising a privacy mask, wherein a current image in the stream of images is encoded with reference to a reference image which is a previously decoded image in the stream of images, wherein the method comprises the steps of:

receiving information from the image sensor representative of pixels of the current image, grouping the pixels into pixel blocks of groups of neighbouring pixels, receiving information representative of a privacy mask area in which the privacy mask is to be applied on the current image, performing pixelation of the privacy mask area, receiving information representative of a movement of the image sensor between capture of the reference image, and capture of the current image, in case the movement of the image sensor is above a threshold value, encoding each pixel block within the privacy mask area as an inter-coded block with a motion vector pointing to a reference pixel block in the reference image and a residual indicative of a pixel value difference between the reference pixel block and the pixel block within the privacy mask area, wherein the motion vector is set equal to the movement of the image sensor and the residual is set to zero.

Setting the motion vector equal to the movement of the camera, and the residual to zero has the effect that all the pixel blocks within the privacy mask area are encoded as copies of their respective reference blocks. This in turn means that it is possible to avoid encoding any noise which would otherwise show up as a change in brightness or colour of the pixel block. In this way, annoying visual artefacts such as blinking or flickering of the privacy mask during movement of the camera are prevented in a simple and efficient manner.

The term "set equal to movement of the image sensor" may be interpreted as the motion vector being set to the amount and direction of movement, as measured in pixels, or other units related to the image, that corresponds to the movement of the image sensor between the capture of the current image and the reference image. It may be noted that the movement of the image sensor causes a change in the field of view of the image sensor, i.e., a change in what part of a scene that is depicted in the images. Thus, wordings which would have the same meaning are, e.g., "set equal to the movement of the field of view", or "set according to (or based on) the movement of the image sensor (or field of view of the image sensor)". Yet another way to phrase this is that the motion vector is set equal to (or according to or based on) the movement of the image sensor in relation to a depicted scene.

According to a variant of the method, first encoding of pixel blocks in the current image are performed independently of the movement of the image sensor, to produce first encoded pixel blocks, and, in case the movement of the image sensor is above the threshold value, in parallel with the first encoding, second inter-coding of pixel blocks within the privacy mask area is performed to produce said inter-coded blocks having a motion vector which is set equal to the movement of the image sensor and having a residual being set to zero, and wherein, those first encoded pixel blocks that correspond to the pixel blocks within the privacy mask area, are replaced by said inter-coded blocks having a motion vector which is set equal to the movement of the image sensor and having a residual being set to zero.

In this way minimal modification of the encoder performing the encoding is needed, since the adaptation of the encoding performed in case of movement is performed in parallel to a "standard", non-adapted encoding of the entire image, including the privacy mask area. A replacement of the blocks within the privacy mask area is performed to produce the final encoded image. This may, e.g., be advantageous in case the encoder performing the encoding is implemented in hardware, and the adaptation of the encoder would otherwise require changes in that hardware. By adding a parallel encoding step, and then replacing the encoded blocks within the privacy mask area, the adaptation of the encoding can be made with minimal changes to the encoder. It may be noted that the first encoding of the pixel blocks within the privacy mask area may produce both inter-coded blocks (P-blocks or B-blocks) and intra-coded blocks (I-blocks), depending on the decisions taken in the encoder performing the encoding. Regardless of the type of block produced by the first encoding within the privacy mask area, these blocks will be replaced by the inter-coded blocks produced by the second inter-coding.

By "independently of the movement of the image sensor" it is understood that motion vectors are calculated without taking the movement of the image sensor into account. In other words, motion vectors are determined by performing a search for a pixel block in the reference image which is similar to a pixel respective block in the current image. The motion vector search is usually started at a position in the reference image corresponding to the position of the respective pixel block in the current image. Typically, a search pattern centered around that position is then used to search for a similar, or usually, the most similar pixel block reachable within the limits of the search pattern. By similar is here meant that the difference in pixel value, i.e., the residual, is low. In case no similar block is found, e.g., if no block with a residual having an absolute value lower than a certain residual threshold value is found, the block may be encoded as an intra-block instead.

According to another variant the encoding of each pixel block within the privacy mask area as an inter-coded block includes:

performing first inter-coding of each pixel block within the privacy mask area to produce an inter-coded block having a non-zero residual, and setting the non-zero residual to zero.

In combination with this setting of the residual to zero after the first inter-coding, as a first option of this variant, the first inter-coding may include setting a motion vector of each pixel block within the privacy mask area equal to the movement of the image sensor. As a second option, the first inter-coding may instead include determining a first motion vector for each pixel block within the privacy mask area independently of the movement of the image sensor, and the encoding of each pixel block within the privacy mask may further comprise: in parallel with the first inter-coding, setting a motion vector of each pixel block within the privacy mask area equal to the movement of the image sensor, and replacing the first motion vector by said motion vector which is set equal to the movement of the image sensor.

Thus, according to the second variant, two sets of encoded blocks within the privacy mask regions are not produced, as was the case in the first variant. This has obvious advantages of requiring less processing power, and less memory usage. However, it may require a modification of the encoder, to allow for controlling the manner of encoding in the privacy mask area during movement. The non-zero residuals may be determined either based on a motion vector which is already set equal to the movement of the image sensor (as in the first option), or based on a motion vector determined by the encoder (as in the second option), which is then replaced by the motion vector set equal to the movement of the image sensor.

The step of performing pixelation of the privacy mask area may comprise grouping pixels within the privacy mask area into pixelation groups of neighbouring pixels, and setting a pixel value of each pixel of a respective pixelation group to a common pixel value representative of the respective pixelation group. The common value may be an average value of pixel values in the pixel block, and more specifically, the common value may be an average of pixel values of a subset of pixels in the respective pixelation group. Using only a selection or subset of pixels when calculating the common value saves calculation time and lowers consumption of processing power.

The information representative of movement of the image sensor may be received from a pan, tilt or zoom controller controlling movement of the image sensor. The information may, e.g., be based on control signals or instructions for controlling a motor moving the image sensor.

In addition, or as an alternative, the information representing movement of the image may be received from a motion sensor. The motion sensor may be arranged to sense the movement of the image sensor and may be in the form of a gyro or an accelerometer. The motion sensor may also be arranged to detect and measure the movement of a motor moving the image sensor. The motor may be in the form of a step-motor which is a common choice for cameras with a movable field of view, such as a PT- or PTZ-camera, and in that case the number of steps moved by the motor may be used as an indication of the movement of the image sensor.

The previously decoded image may be a previously captured image in the stream of images, as is the case when P-frame inter-coding is used.

The previously decoded image may be a later captured image in the stream of images, which has been previously encoded and decoded for use as the reference image. This would be the case when B-frame inter-coding is used.

The information representative of the pixels in the image is at least one from the group consisting of data on luminance, light intensity, and colour values. All of these represent commonly used ways of representing pixel values in an image.

According to a second aspect, the above discussed and other objects are achieved, in full or at least in part, by an image encoding system for encoding a stream of images captured by an image sensor and comprising a privacy mask, wherein a current image in the stream of images is encoded with reference to a reference image which is a previously decoded image in the stream of images, the system comprising:

a receiving module arranged to receive information from the image sensor representative of pixels of the current image, and grouping the pixels into pixel blocks of groups of neighbouring pixels a privacy mask module arranged to receive information representative of a privacy mask area in which the privacy mask is to be applied to the current image, and perform pixelation of the privacy mask area, a movement input module arranged to receive information representative of a movement of the image sensor between capture of the reference image, and capture of the current image, an encoder module arranged to, in case the movement is above a threshold value, encode each pixel block within the privacy mask area as an inter-coded block with a motion vector pointing to a reference pixel block in the reference image and a residual indicative of a pixel value difference between the reference pixel block and the pixel block within the privacy mask area, wherein the motion vector is set equal to the movement of the image sensor and the residual is set to zero.

According to a third aspect, this and other objects are achieved, in full or at least in part, by a camera comprising an encoding system according to the second aspect.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the embodiments are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "a unit" or "the unit" may include several units, and the like. Furthermore, the word "comprising" does not exclude other elements or steps.

BRIEF DESCRIPTION OF THE DRAWINGS

The embodiments will now be described in more detail by way of example and with reference to the accompanying schematic drawings, in which.

DETAILED DESCRIPTION

Figure 1:
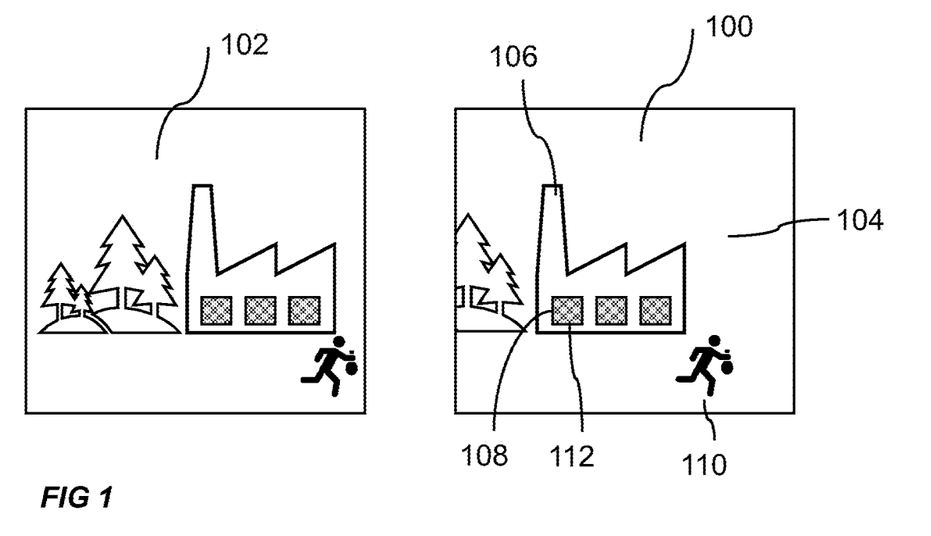
FIG. 1 illustrates two images of a monitored scene.

FIG. 1 shows two images 100 and 102 depicting a scene 104. The images are captured by a camera 300 having a movable field of view. The camera 300 is illustrated in more detail in FIG. 3. The camera 300 has changed its field of view slightly between the capture of image 102 and the capture of image 100, and, thus, the image 100 shows a slightly different part of the scene 104.

In the scene 104, there is a building 106, having windows 108. A person 110 is also present in the image. The person 110 has moved between the capture of the images 102 and 100, to illustrate that the camera 300 can follow the movement of the person 110 through the scene 104 by changing its field of view.

In the images 100,102, the windows 108 of the building 106 are covered by privacy masks 112, in order to hide any sensitive content, such as persons or other objects, present within the building 106 and otherwise visible through the windows 108. The privacy masks 112 are provided in the form of pixelated privacy masks. As mentioned, a pixelated privacy mask is an attractive choice since it may be configured to allow some insight in the content of the scene behind the mask, while maintaining the privacy of the masked part of the scene.

Figure 2A:
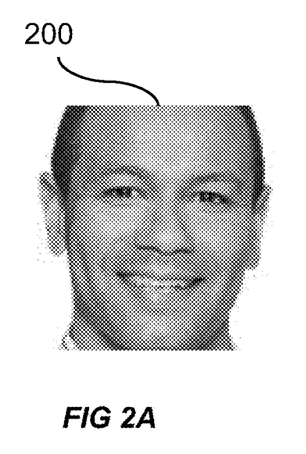
FIGS. 2A-C show an image and different pixelation levels.
Figure 2B:
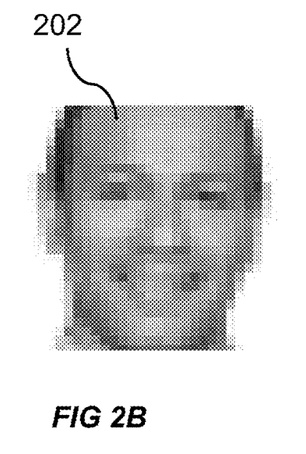

FIGS. 2A-C illustrate an image and a pixelation privacy mask. In FIG. 2A, an image 200 of a human face is shown. In FIG. 2B, a pixelation has been applied to the image 200, where pixels in the image have been grouped into pixelation groups 202. For each pixelation group 202, all pixels in the pixelation group are set to one common value, representing the pixel values in that pixelation group. For instance, an average of all the pixel values in the group may be used. However, more commonly, an average of a subset of the pixel values in the group is used as the common value. Since a pixelation group can contain several hundred pixels, the computing effort of calculating average values for all the pixelation groups in the masked area quickly becomes overwhelming. The computing effort is drastically reduced when an average of, say, the first 8 pixels in the pixelation group instead is used as the one common value, and therefore, this is a commonly used strategy to provide the common value for the pixelation groups.

Figure 2C:
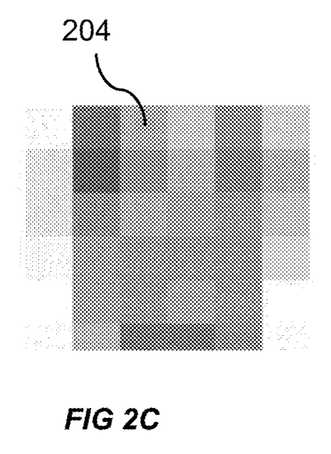

Returning to FIG. 2B, it may be noted that it is still possible to detect that there is a face behind the pixelation. It might even be possible to recognize the identity of that person. FIG. 2C shows an example where pixelation groups 204 of a larger size have been used. In the same way as in FIG. 2B, a common value is set for all pixels within a pixelation group 204, but since the pixelation groups 204 are larger, less information is left in the masked area, thereby making it more difficult to detect the face. The size of the pixelation groups may be chosen depending on factors such as the size of the image, the distance to objects that need to be masked out, and the degree to which the masked objects are to be made unidentifiable.

Figure 3:
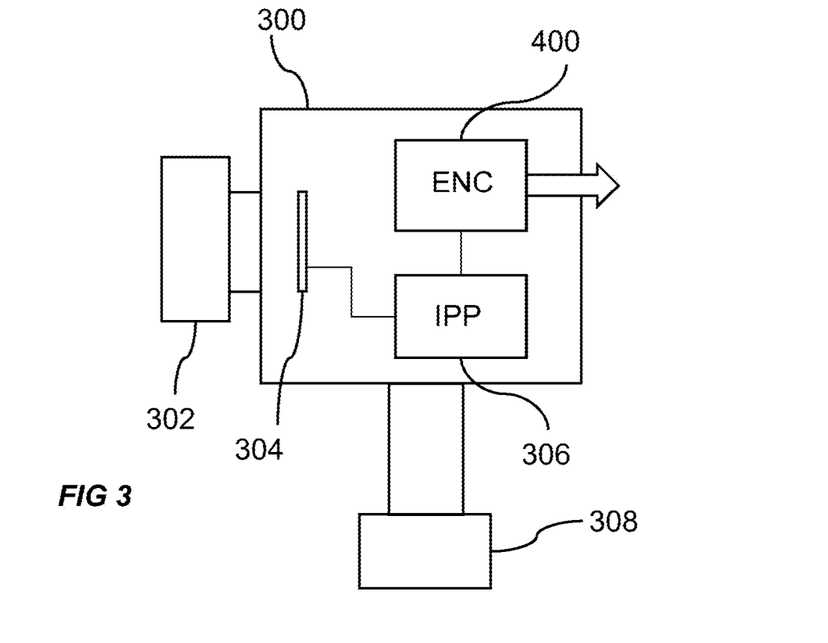
FIG. 3 is a block diagram of a camera.

FIG. 3 illustrates the camera 300. The camera 300 comprises optics 302 and an image sensor 304, as is generally known per se. The camera 300 also includes an image encoding system 400, as illustrated in more detail in FIG. 4, and an image processing module 306, which also may be referred to as an image processing pipeline, IPP. The IPP may, e.g., perform demosaicing, noise filtering, sharpening and tone mapping. The camera 300 is mounted on a PT unit 308, which is able to move the camera 300 in a panning or tilting motion, whereby the camera 300 is able to capture images of different parts of the scene 104. As the skilled person would realize, the camera can have additional components, but as they are not necessary for understanding the present concepts, they are not shown in the figures and will not be discussed further.

Figure 4:
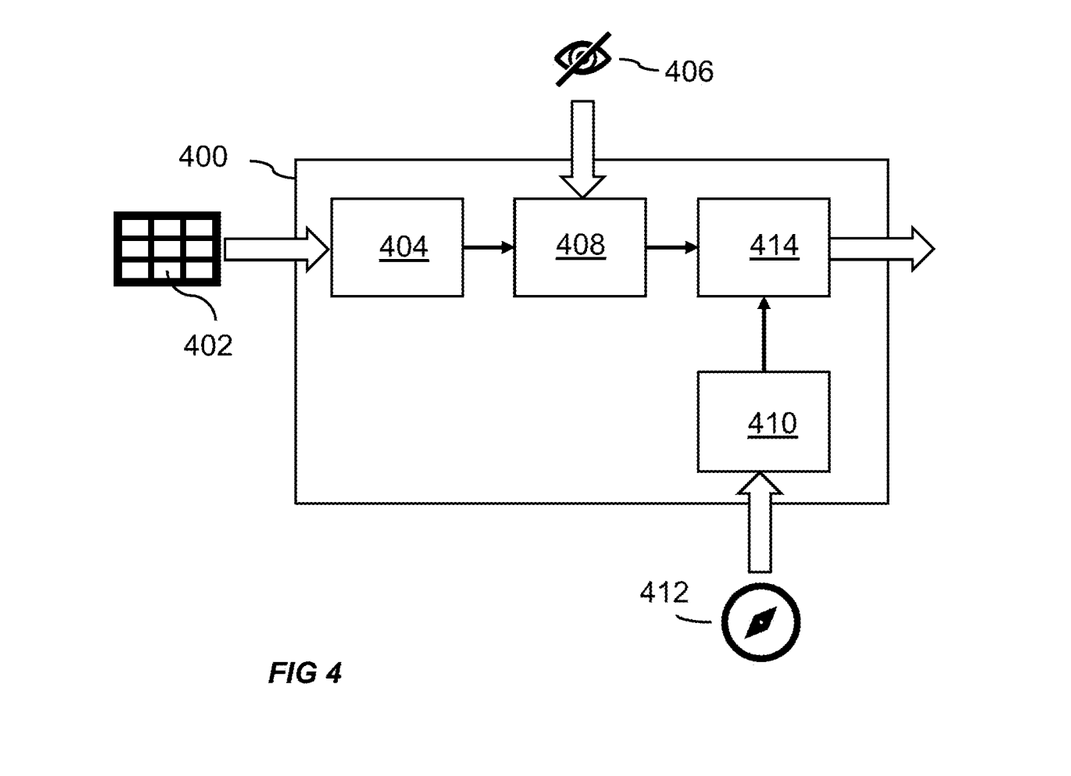
FIG. 4 is a block diagram of an encoding system.

FIG. 4 illustrates the encoding system 400. The encoding system 400 receives information 402 representative of pixels of the image 100. The information 402 is received from the image sensor 304, via the IPP 306, in a receiving module 404.

Figure 5A:
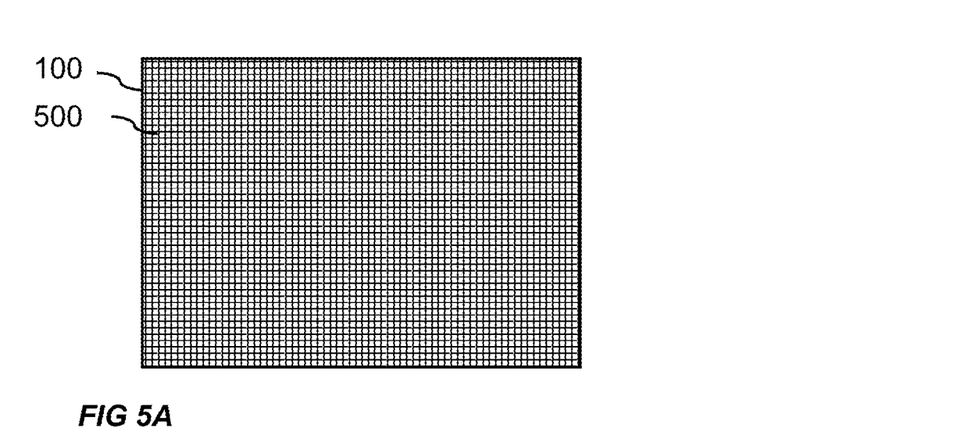
FIGS. 5A-B illustrate an image with pixels and with pixel blocks.
Figure 5B:
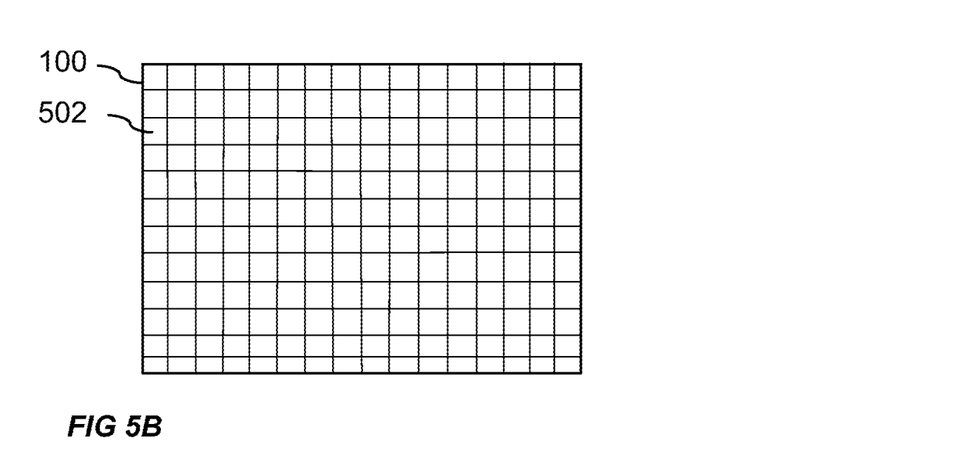

FIGS. 5A-B show the principal structure of the image 100. The image 102 and other images captured by the camera 300 have the same principal structure as image 100. The image 100 is made up of a number of pixels 500, corresponding to the pixels of the image sensor 304 of the camera 300. The image may, for instance, be made up of 1280×720 pixels, 1920×1080 pixels, or 3840×2160 pixels.

The receiving module 404 organizes the pixels 500 into pixel blocks 502 comprising groups of neighbouring pixels 500. The pixel blocks 502 are shown in FIG. 5B. The pixel blocks 502 may also be denoted macroblocks, coding tree units or encoding units, depending on the encoding standard used to encode the images. The pixel blocks 502 may in most cases be square, comprised of, e.g., 8×8, 16×16, or 32×32 pixels. It is also possible to group the pixels 502 into pixel blocks of other sizes and shapes.

Returning to FIG. 4, in addition to receiving information 402 representative of image pixels, the encoding system 400 receives information 406 representative of a privacy mask area, where a privacy mask, such as the privacy mask 108, is to be applied to the image 100. The information 406 is received by a privacy mask module 408, which then applies the privacy mask to the privacy mask area by performing pixelation of the privacy mask area.

The encoding system 400 further comprises a movement input module 410, which receives information 412 about the movement of the image sensor between the capture of a current image, in this case image 100, and an image used as a reference image in the encoding of the current image. The information 412 is typically received from the PT unit 308 and may be based on control instructions to a motor used to move the camera 300, or on output from a sensor which is arranged to sense the movement of the motor moving the camera. As an alternative, the movement information 412 may be received from a motion sensor, such as a gyro or an accelerometer, which detects and measures the movement of the camera.

It may be noted that the movement of the image sensor is normally the same as the movement of the camera, since the image sensor is secured in the camera. Hence, the term "movement of the camera" and "movement of the image sensor" are used interchangeably in this text. In the unlikely case that the image sensor would be movable in relation to the camera, the present invention would need information on the movement of the image sensor in itself as well as information on the movement of the camera. The joint movement would then represent the movement of interest, i.e., how much the field of view has moved between the capture of two images.

Finally, the image is encoded in an encoder module 414, using inter-compression encoding. Block based hybrid codecs, such as a H.264, H.265 (HEVC), MPEG-4 Part 2, AV1 or VP9 codec, with an encoding structure organizing the video stream in groups of pictures, GOPs may be used.

Normally each GOP is started by an intra-coded image, I-frame, followed by several inter-coded images, P- or B-frames. In intra-coded images, image information is encoded without reference to other images in the image stream, and in inter-coded images, image information is encoded with reference to other images in the image stream. The herein described encoding method is primarily relevant for the encoding of inter-coded images. Therefore, it may be noted that the encoded pixel blocks in the privacy mask area will normally be updated at each start of a new GOP, when a new I-frame is encoded. Since the intra-frame encoding will not be affected by the adapted encoding described herein, it will not be further discussed.

Thus, for inter-coded images, the encoder module 414 is arranged to encode the image with reference to a reference image in the form of a previously decoded image. In the context of the example shown in FIG. 1, the reference image for image 100 may be image 102, i.e., a previously captured image which has been encoded and then decoded by the encoder module to serve as a reference image. It is often the case for a real-time application, such as in surveillance situations, that a previously captured image is used as a reference image, i.e., P-frame encoding, but if a delay can be accepted, it would also be possible to use a later captured image as reference image, i.e., B-frame encoding. The delay, as is well-known, is caused by the wait for the later image to be captured, encoded and then decoded, to be made available for the use as reference image.

In general terms, the encoder module 414 performs a motion vector search in the reference image, i.e., image 102, for a reference pixel block similar to a respective pixel block in the current image, i.e., image 100. If a similar block is found in the reference image, the pixel block in the current image is inter-coded with a motion vector representing the difference in location to the reference block and with a residual that represents the difference in pixel value to the reference block. In case no similar reference block is found, the pixel block is encoded as an intra-block instead. It may be added that additional cost analysis may be used to refine the decision between inter- and intra-coding of pixel blocks, such as described in applicant's previous application EP3370419.

However, the encoder module 414 in the is modified to better cope with a problem that presents itself in relation to pixelated masks in images from cameras with a movable field of view, namely that the pixelated masks flicker or blink when the camera moves its field of view, thereby creating an unpleasant viewing experience. As the inventors have realized, this problem is often due to the fact that noise causes the common value in a pixelation group to vary between images, even when there in reality is no difference in the content of the scene between the image to be encoded and the reference image.

The effect is especially pronounced when the method of using an average of a subset of only a few of the pixels in each pixelation group pixels as the common value for the pixelation group is employed. This since the spatial filtering effect which helps in levelling out the noise is lower when only a small number of pixel values is averaged. As explained above, using an average for the entire pixelation group as the common value tends to be an unattractive option for processing power consumption reasons.

According to the present embodiments, the flickering is mitigated by adapting the encoding of pixel blocks within the privacy mask area during camera movement, such that any pixel block within the privacy mask area is encoded as a copy of the corresponding block in the reference image.

This is achieved by using the information on the movement of the camera to find the motion vector pointing to the correct reference block in the reference image, and then encoding the pixel blocks within the privacy mask area as inter-coded blocks with a zero residual and a motion vector according to the movement of the camera. To determine when this encoding adaption should be active, the amount of movement of the camera will be compared to a threshold, which may be zero or a value above zero, at which value it has been determined that there will be substantial flickering occurring in pixelated areas, which will be perceived as an annoying visual artefact by a viewer.

Thus, when encoding pixel blocks within the privacy mask area, the encoder module 414 will use the information 412 about camera movement, received via the movement input module 410, to determine if the camera is moving or not, and, if the camera is moving, the encoding will be adapted to avoid the problem of flickering pixelated masks during movement. This adapted encoding may be achieved in (at least) two slightly different ways, as will now be explained with reference to FIGS. 6A and 6B.

Figure 6A:
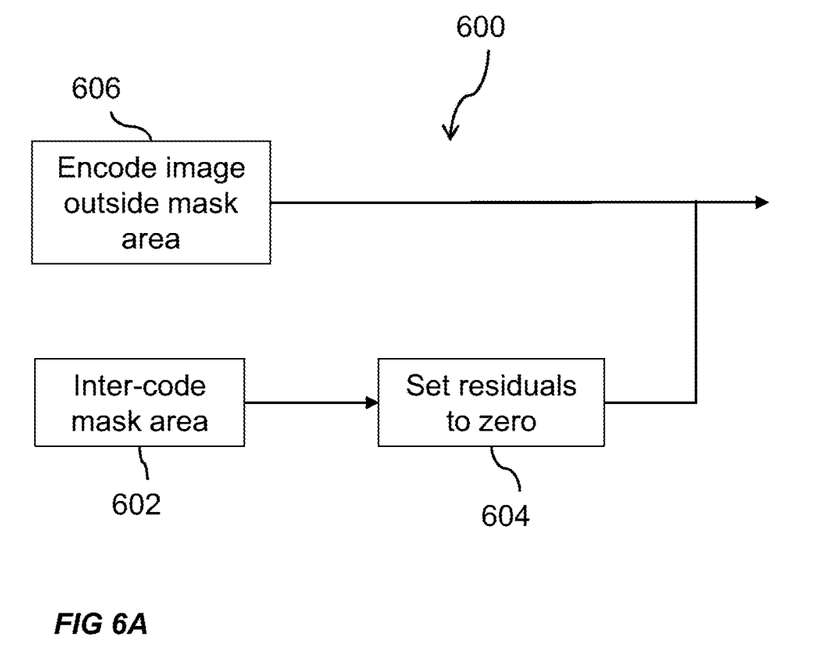
FIGS. 6A-B are flow charts illustrating two variants of the encoding method.

In FIG. 6A a first variant 600 is illustrated, wherein the encoder module, in step 602, performs inter-coding of all blocks within the privacy mask area when the movement of the camera is above the threshold. In this inter-coding, the motion vectors of all the pixel blocks in the mask area are set equal to the movement of the camera, either before or after residuals are determined. In other words, the encoder module might either set the motion vectors equal to the movement and calculate the residuals based on that, or the encoder module might first calculate motion vectors according to a motion vector search and as a second step replace those motion vectors with motion vectors which are set equal to the movement of the image sensor.

Due to, e.g., noise, the residuals that are calculated may be non-zero, so in a next step 604, the residuals of the inter-coded blocks in the privacy mask area are all set to zero, in order to encode each block as a copy of the reference block. In addition, possibly in parallel, the remaining image, i.e., the parts outside the privacy mask area, are encoded in step 606 according to a standard inter-compression encoding process, resulting in the pixel blocks in the image being encoded as inter-blocks (P-blocks, or possibly B-blocks, if such are allowed) with reference to the reference image, or intra-blocks (I-blocks) which are encoded without reference to the reference image.

Figure 6B:
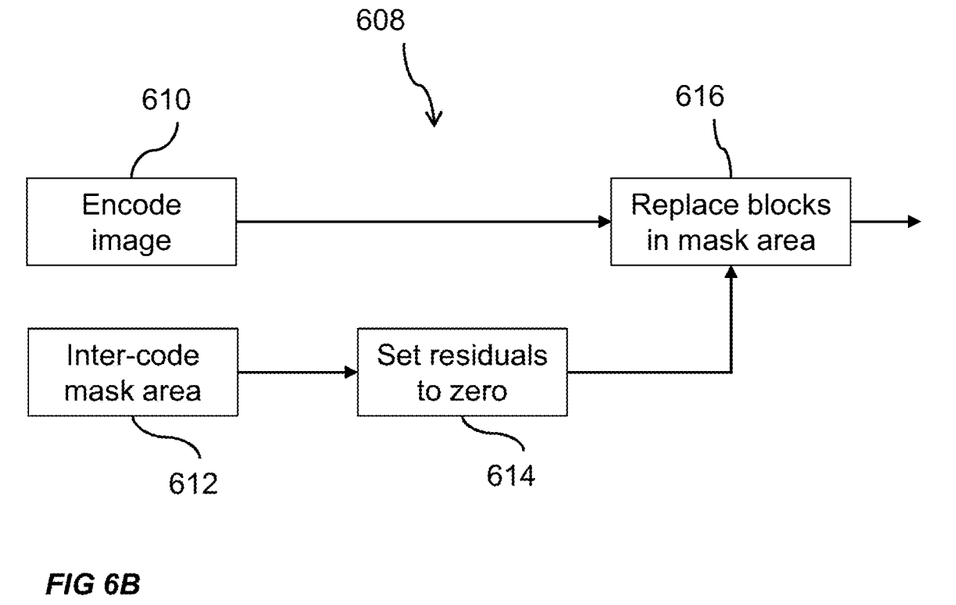

In FIG. 6B a second variant 608 is illustrated, wherein the encoder module will encode blocks within the privacy mask area twice, when the camera is moving. A first encoding is performed in step 610, for all pixel blocks in the image, including those in the pixel mask area, according to a standard inter-compression encoding process. This first encoding results in the pixel blocks in the image being encoded as inter-blocks (P-blocks or possibly B-blocks, if such are allowed) with reference to the reference image, having motion vectors and residuals calculated according to non-adapted procedures in the encoder, or intra-blocks (I-blocks) which are encoded without reference to the reference image.

In addition (e.g., in parallel) to this first encoding, inter-coding of blocks within the privacy mask area is performed in step 612. In this step, the motion vectors are set equal to the camera movement, either before or after residuals have been calculated. This produces inter-coded blocks where, again, the residuals may be non-zero, and, again, just as in the variant illustrated in FIG. 6A, these residuals are therefore set to zero in step 614.

Next, in step 616, the encoded pixel blocks within the privacy mask area that were produced by the encoding performed in step 610 will be replaced by the encoded pixel blocks that were produced by the inter-coding in step 612 and 614, i.e., the encoded pixel blocks with the motion vector set equal to the movement of the camera and with the residual set to zero.

Figure 7:
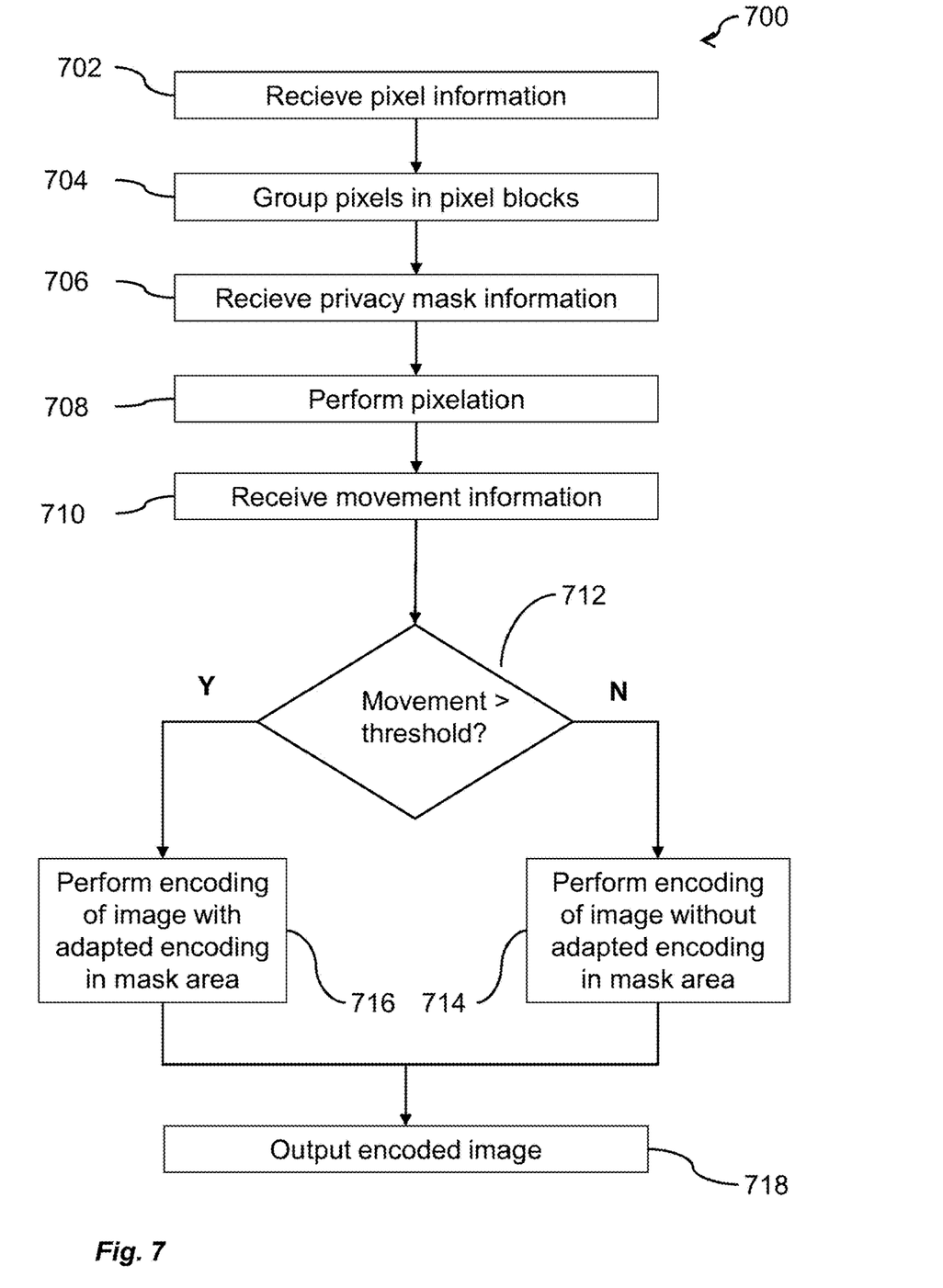
FIG. 7 is a flow chart illustrating the encoding method.

In FIG. 7, an overview of the encoding method 700 is given in a flow-chart. In step 702, pixel information is received from the image sensor (via the IPP, as mentioned above). In step 704, the pixels are grouped in pixel blocks, in preparation for the encoding. In step 706, information is received specifying the position and extension of a privacy mask area which is to be covered by a pixelated privacy mask, and in step 708 pixelation of this area is performed. In step 710, information regarding the movement of the camera is received, and, in step 712, this movement is compared to a threshold. If the movement is below the threshold, the method proceeds to step 714, and no adaptation of the encoding according to the present teachings based on the camera movement is performed. The encoding proceeds in a normal fashion, and in step 718, an encoded image is output.

In other words, when the movement is below the threshold, the encoding is performed as described above by performing a motion vector search in the reference image, to find a reference pixel block similar to a respective pixel block in the current image. The search might aim to find the pixel block having the smallest difference in pixel value, i.e., the smallest residual, and be conducted according to a pre-defined search pattern in the reference image, typically centred around the position corresponding to the position of the respective pixel block in the current image.

If a similar pixel block is found in the reference image, the pixel block in the current image is inter-coded with a motion vector representing the difference in location to the reference block and with a residual that represents the difference in pixel value to the reference block. In case no similar reference block is found, the pixel block is encoded as an intra-block instead.

As mentioned previously, it would also be possible to perform additional encoding cost analysis to refine the decision between inter- and intra-coding of pixel blocks, such as by taking the cost of encoding the motion vector into account as well, and selecting the reference block with the lowest encoding cost based on both the residual and the motion vector.

If, on the other hand, the movement is above the threshold, the encoding of pixel blocks within the privacy mask area is adapted according to one of the variants illustrated in FIGS. 6A-B, producing pixel blocks in the privacy mask area with a motion vector set according to the movement of the camera, in other words equal to the movement of the camera, and with a zero residual. The remaining image is also encoded, but without being affected by this particular adaptation. Obviously, other steps and measures may be taken in order to improve the encoding during movement of the camera, but such are not within the scope of this invention and will not be discussed further herein. Finally, an encoded image is output in step 718.

To summarize, image encoding within a pixelated privacy mask area is adapted in order to reduce flickering during movement of a camera. Motion vectors are set equal to the movement of the camera, and residuals are set to zero, thereby encoding pixel blocks within the privacy mask areas as copies of corresponding pixel blocks in a reference image.

The method may be carried out by executing instructions stored on a computer-readable storage medium. The instructions may be executed by any kind of processor, e.g., a central processing unit (CPU), a graphics processing unit (GPU), a custom made processing device implemented in an integrated circuit, an ASIC, an FPGA, or logical circuitry including discrete components.

The encoding system may be embodied as software, firmware, hardware, or any combination thereof.

Thus, the invention should not be limited to the shown embodiments but should only be defined by the appended claims.

LIST OF REFERENCE NUMERALS

100 Image
102 Image
104 Scene
106 Building
108 Windows
110 Person
112 Privacy mask
200 Image
202 Pixelation group
204 Pixelation group
300 Camera
302 Optics
304 Image sensor
306 Image processing module, IPP
308 PT unit
400 Encoding system
402 Pixel information
404 Receiving module
406 Privacy mask area information
408 Privacy mask module
410 Movement input modul
412 Movement information
414 Encoder module
500 Pixel
502 Pixel block

The invention claimed is:

1. A method of encoding a stream of images captured by an image sensor and comprising a privacy mask, wherein a current image in the stream of images is encoded with reference to a reference image which is a previously encoded image in the stream of images, the method comprising:
receiving information from the image sensor representative of pixels of the current image,
grouping the pixels into pixel blocks of groups of neighbouring pixels,
receiving information specifying position and extension of a privacy mask area in which the privacy mask is to be applied on the current image,
performing pixelation of the privacy mask area, wherein the step of performing pixelation of the privacy mask area comprises:
grouping pixels within the privacy mask area into pixelation groups of neighbouring pixels, and
setting a pixel value of each pixel of a respective pixelation group to a common pixel value representative of the respective pixelation group,
receiving information representative of a movement of the image sensor between capture of the reference image, and capture of the current image, wherein the information representative of movement of the image sensor is received from a pan, tilt or zoom controller controlling movement of the image sensor, or from a motion sensor,
on a condition that the movement of the image sensor is above a threshold value, encoding each pixel block within the pixelated privacy mask area as an inter-coded block with a motion vector pointing to a reference pixel block in the reference image and a residual indicative of a pixel value difference between the reference pixel block and the pixel block within the pixelated privacy mask area, wherein the motion vector is set equal to the movement of the image sensor and the residual is set to zero.

2. The method of claim 1, further comprising, performing first encoding of pixel blocks in the current image independently of the movement of the image sensor, to produce first encoded pixel blocks, and,
on the condition that the movement of the image sensor is above the threshold value, in parallel with the first encoding, performing second inter-coding of pixel blocks within the privacy mask area to produce said inter-coded blocks having a motion vector which is set equal to the movement of the image sensor and having a residual being set to zero, and
replacing those first encoded pixel blocks that correspond to the pixel blocks within the privacy mask area, by said inter-coded blocks having a motion vector which is determined based on the movement of the image sensor and having a residual being set to zero.

3. The method of claim 1, wherein encoding each pixel block within the privacy mask area as an inter-coded block includes:
performing first inter-coding of each pixel block within the privacy mask area to produce an inter-coded block having a non-zero residual, and
setting the non-zero residual to zero.

4. The method of claim 3, wherein the first inter-coding includes setting a motion vector of each pixel block within the privacy mask area equal to the movement of the image sensor.

5. The method of claim 3, wherein the first inter-coding includes determining a first motion vector for each pixel block within the privacy mask area independently of the movement of the image sensor, and wherein the encoding of each pixel block within the privacy mask further comprises:
in parallel with the first inter-coding, setting a motion vector of each pixel block within the privacy mask area equal to the movement of the image sensor, and replacing the first motion vector by said motion vector which is set equal to the movement of the image sensor.

6. The method of claim 1, wherein the common pixel value is an average of pixel values of a subset of pixels in the respective pixelation group.

7. The method of claim 1, wherein the previously decoded image is a previously captured image in the stream of images.

8. The method of claim 1, wherein the previously decoded image is a later captured image in the stream of images, which has been previously encoded and decoded for use as the reference image.

9. The method of claim 1, wherein the information representative of the pixels in the image is at least one from the group consisting of data on luminance, light intensity, and colour values.

10. An image encoding system for encoding a stream of images captured by an image sensor and comprising a privacy mask, wherein a current image in the stream of images is encoded with reference to a reference image which is a previously decoded image in the stream of images, the system comprising:

a receiving module arranged to receive information from the image sensor representative of pixels of the current image, and grouping the pixels into pixel blocks of groups of neighbouring pixels, a privacy mask module arranged to receive information specifying position and extension of a privacy mask area in which the privacy mask is to be applied to the current image, and perform pixelation of the privacy mask area, wherein pixelation of the privacy mask area comprises grouping pixels within the privacy mask area into pixelation groups of neighbouring pixels, and setting a pixel value of each pixel of a respective pixelation group to a common pixel value representative of the respective pixelation group, a movement input module arranged to receive information representative of a movement of the image sensor between capture of the reference image, and capture of the current image, wherein the movement input module is arranged to receive the information representative of movement of the image sensor from a pan, tilt or zoom controller controlling movement of the image sensor, or from a motion sensor, an encoder module arranged to, in case the movement is above a threshold value, encode each pixel block within the pixelated privacy mask area as an inter-coded block with a motion vector pointing to a reference pixel block in the reference image and a residual indicative of a pixel value difference between the reference pixel block and the pixel block within the pixelated privacy mask area, wherein the motion vector is set equal to the movement of the image sensor and the residual is set to zero.

11. A camera comprising an image encoding system for encoding a stream of images captured by an image sensor and comprising a privacy mask, wherein a current image in the stream of images is encoded with reference to a reference image which is a previously decoded image in the stream of images, the system comprising:

a receiving module arranged to receive information from the image sensor representative of pixels of the current image, and grouping the pixels into pixel blocks of groups of neighbouring pixels, a privacy mask module arranged to receive information specifying position and extension of a privacy mask area in which the privacy mask is to be applied to the current image, and perform pixelation of the privacy mask area, wherein pixelation of the privacy mask area comprises grouping pixels within the privacy mask area into pixelation groups of neighbouring pixels, and setting a pixel value of each pixel of a respective pixelation group to a common pixel value representative of the respective pixelation group, a movement input module arranged to receive information representative of a movement of the image sensor between capture of the reference image, and capture of the current image, wherein the movement input module is arranged to receive the information representative of movement of the image sensor from a pan, tilt or zoom controller controlling movement of the image sensor, or from a motion sensor, an encoder module arranged to, in case the movement is above a threshold value, encode each pixel block within the pixelated privacy mask area as an inter-coded block with a motion vector pointing to a reference pixel block in the reference image and a residual indicative of a pixel value difference between the reference pixel block and the pixel block within the pixelated privacy mask area, wherein the motion vector is set equal to the movement of the image sensor and the residual is set to zero.

\* \* \* \* \*